(12) United States Patent
Rollin et al.

(10) Patent No.: US 7,316,156 B2
(45) Date of Patent: Jan. 8, 2008

(54) LIMITED SLIP DIFFERENTIAL PERFORMANCE SIMULATION PROCEDURE

(75) Inventors: Anthony Joseph Rollin, Midlothian, VA (US); David Joseph Harer, Richmond, VA (US); Dale Michael Brown, Chesterfield, VA (US)

(73) Assignee: Afton Chemical Corporation, Richmond, VA (US)

( * ) Notice: Subject to any disclaimer, the term of this patent is extended or adjusted under 35 U.S.C. 154(b) by 269 days.

(21) Appl. No.: 11/128,528

(22) Filed: May 13, 2005

(65) Prior Publication Data

US 2006/0271343 A1    Nov. 30, 2006

(51) Int. Cl.
*G01M 15/00* (2006.01)
(52) U.S. Cl. .................................. 73/117.2
(58) Field of Classification Search ............. 73/10, 73/117.2, 117.3, 118.1
See application file for complete search history.

(56) References Cited

U.S. PATENT DOCUMENTS

| | | | | |
|---|---|---|---|---|
| 3,913,377 A | * | 10/1975 | Lindeman | 73/10 |
| 4,914,807 A | * | 4/1990 | Cook | 29/700 |
| 5,012,908 A | * | 5/1991 | Kobayashi et al. | 192/35 |
| 5,036,963 A | * | 8/1991 | Murata | 192/35 |
| 5,372,735 A | | 12/1994 | Ohtani et al. | |
| 5,392,640 A | * | 2/1995 | Fukuda et al. | 73/117 |
| 5,441,656 A | | 8/1995 | Ohtani et al. | |
| 5,465,616 A | * | 11/1995 | Shibayama et al. | 73/118.1 |
| 5,472,385 A | * | 12/1995 | Vu | 475/251 |
| 5,483,823 A | * | 1/1996 | Shibayama et al. | 73/118.1 |
| 5,503,603 A | * | 4/1996 | Adam et al. | 475/204 |

FOREIGN PATENT DOCUMENTS

JP    2006317436 A    *    11/2006

OTHER PUBLICATIONS

"Prediction of Anti-Shudder Properties of Automatic Transmission Fluids Using a Modified SAE No. 2 Machine", Ohtani et al., SAE Technical Paper 940821, 1994.
"Additive Technology for Limited Slip Differentials" Rafel Flores, Master's Thesis, Lulea University of Technology, 179 CIV, 2004.

* cited by examiner

*Primary Examiner*—Hezron Williams
*Assistant Examiner*—John Fitzgerald
(74) *Attorney, Agent, or Firm*—Luedeka, Neely & Graham, P.C.

(57) ABSTRACT

A method of simulating a split μ axle test for limited slip differentials for automotive applications. The method includes treating a clutch pack for a limited slip differential in a lubricant composition for a first period of time at a predetermined temperature. The clutch pack is mounted in a friction testing rig. A predetermined amount of test fluid is provided to the testing rig. A drive for the testing rig is cycled on and off for a predetermined number of on and off cycles. When the drive is on, a predetermined relative rotational speed between friction plates and metal plates in the clutch pack is generated.

23 Claims, 20 Drawing Sheets

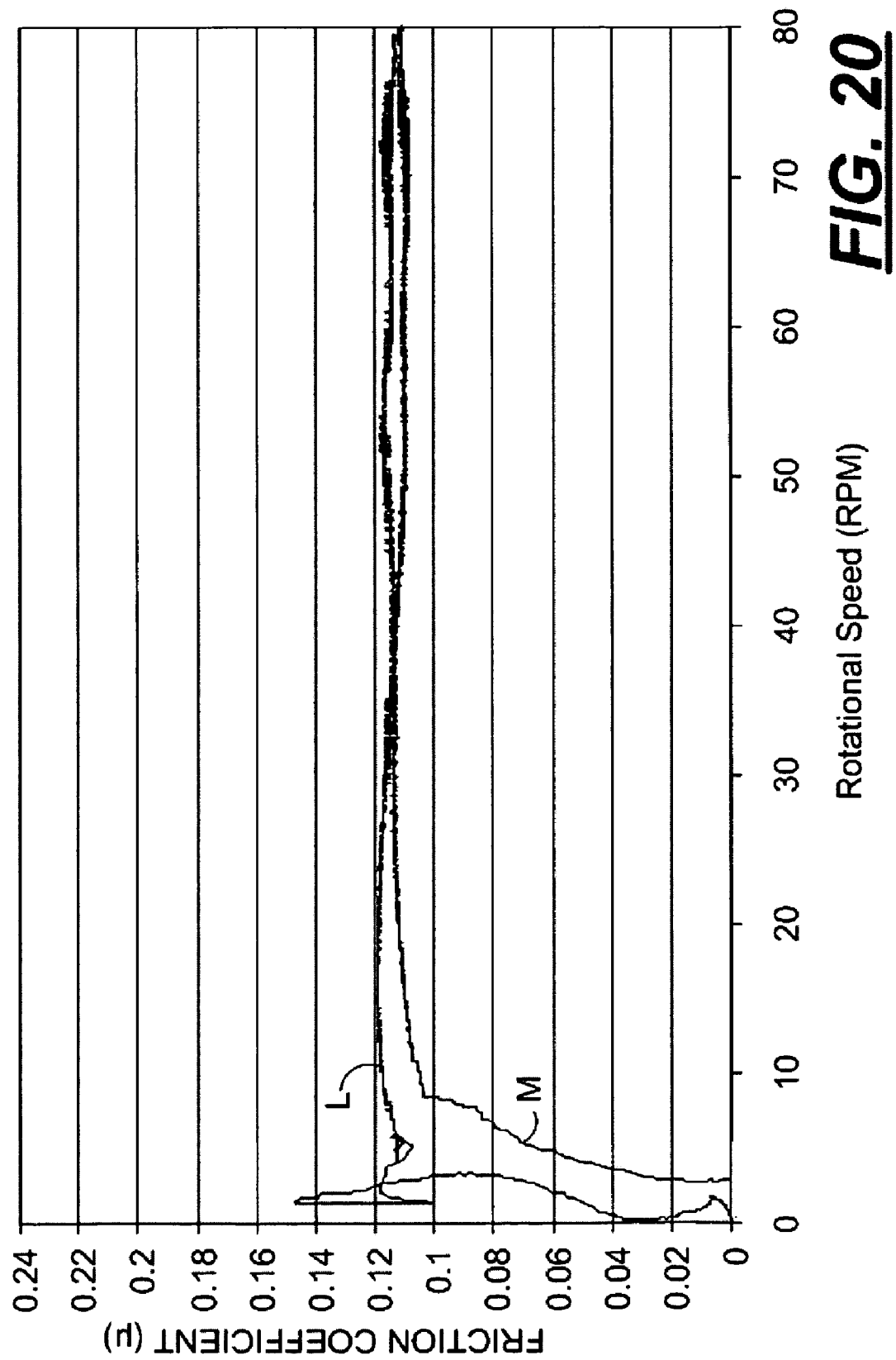

LIMITED SLIP DIFFERENTIAL PERFORMANCE SIMULATION PROCEDURE

TECHNICAL FIELD

The embodiments described herein relate to simulation of full-scale vehicle performance tests and in particular to simulation of performance tests for limited slip differentials for automotive applications.

BACKGROUND

The frictional characteristics, and therefore the tendency for shudder, of limited slip differentials are typically obtained by full scale vehicle testing, wherein a vehicle containing the differential is operated over a predetermined test cycle. According to a conventional test procedure, a limited slip differential is prepared and installed in a vehicle. The vehicle is driven for a predetermined number of miles over various surfaces. Evaluation of the clutch packs and fluids is conducted during the test procedure. However, the foregoing procedure requires an actual vehicle and reproduction of the test results may vary with ambient conditions used for testing.

Accordingly, there is a need for a simplified bench scale test procedure that can accurately predict the performance of clutch packs and fluids without conducting expensive vehicle testing.

SUMMARY OF THE EMBODIMENTS

In one embodiment, there is provided a method for simulating a split μ axle test for limited slip differentials in automotive applications. The method includes treating a clutch pack for a limited slip differential in a lubricant composition for a first period of time at a predetermined temperature. The clutch pack is mounted in a friction testing rig. A predetermined amount of test fluid is provided to the testing rig. A drive for the testing rig is cycled on and off for a predetermined number of on and off cycles. When the drive is on, a predetermined relative rotational speed between friction plates and metal plates in the clutch pack is generated.

In another embodiment, there is provided a method of mapping friction characteristics for limited slip differentials for automotive applications. The method includes mounting a clutch pack containing residual fluid thereon in a low speed friction testing rig. The sump or reservoir of the testing rig is substantially devoid of test fluid. Friction characteristics in the clutch pack are generated as a function of temperature and pressure by rotating the clutch pack under conditions that produce relative rotational speed between friction plates and metal plates of the clutch pack. Torque produced from friction in the clutch pack is recorded during the procedure.

In yet another embodiment, there is provided a bench test procedure for evaluating materials for limited slip differentials for automotive applications. The bench test procedure includes treating a clutch pack for a limited slip differential in a lubricant composition for a first period of time at a predetermined temperature. The clutch pack is then mounted in a friction testing rig containing a slow speed drive. A predetermined amount of test fluid is provided to the testing rig. A drive for the testing rig is cycled on and off for a predetermined number of on and off cycles. When the drive is on, a predetermined relative rotational speed between friction plates and metal plates in the clutch pack is generated. Subsequently, the test fluid is drained from the friction testing rig so that the testing rig is substantially devoid of fluid. Friction characteristics in the clutch pack are generated as a function of temperature and pressure by rotating the clutch pack under conditions that product relative rotational speed between friction plates and metal plates of the clutch pack. Torque produced from friction in the clutch pack is recorded during the procedure.

An advantage of a dry sump procedure according to the disclosure is that the method provides friction characteristic maps that are generated under conditions that closely emulate those in certain limited slip axles where static fluid levels are not high enough to reach the clutch pack except by splash lubrication while the axle is rotating. Another advantage of the embodiments is the ability to emulate the clutch pack condition during friction mapping using a dry sump configuration so that a lack of immersion lubrication in a vehicle's axle is simulated. Dry sump friction testing is a suitable model for determining limited slip clutch pack friction characteristics.

Yet another advantage of the embodiments described herein is that the bench scale friction test or "split μ simulation" provides a relatively low cost alternative to full-scale vehicle testing. Further benefits such as reduced test time, minimal fluid requirement, and the ability to easily monitor heat buildup in the clutch pack are associated with the split μ simulation procedure described herein.

BRIEF DESCRIPTION OF THE DRAWINGS

Further advantages of the embodiments may be better understood by reference to the detailed description when considered in conjunction with the figures, which are not to scale and which are provided to illustrate the principle features described herein.

FIG. 20 is an rpm-domain graph of coefficient of friction versus rotational speed for a dry sump friction mapping cycle according to the disclosure on a clutch pack that was aged using a split μ vehicle test;

DETAILED DESCRIPTION OF EMBODIMENTS

An objective of the embodiments of the disclosure was to simulate a performance test for a rear axle of a vehicle containing a limited slip differential. The performance test may be used to evaluate materials for the axle as well as lubricants suitable for limited slip differential applications. The full scale vehicle test is referred to herein as a split μ (or split mu) vehicle test. The procedure involves spinning one rear wheel of a vehicle while holding the rpm of the other wheel at much lower rotational speed. This is accomplished by lowering the coefficient of friction (μ) for one wheel while maintaining a high coefficient for the other wheel, thus the name, split μ test. By way of background, the split μ test is conducted by subjecting a vehicle to the following procedure.

Figure 1:
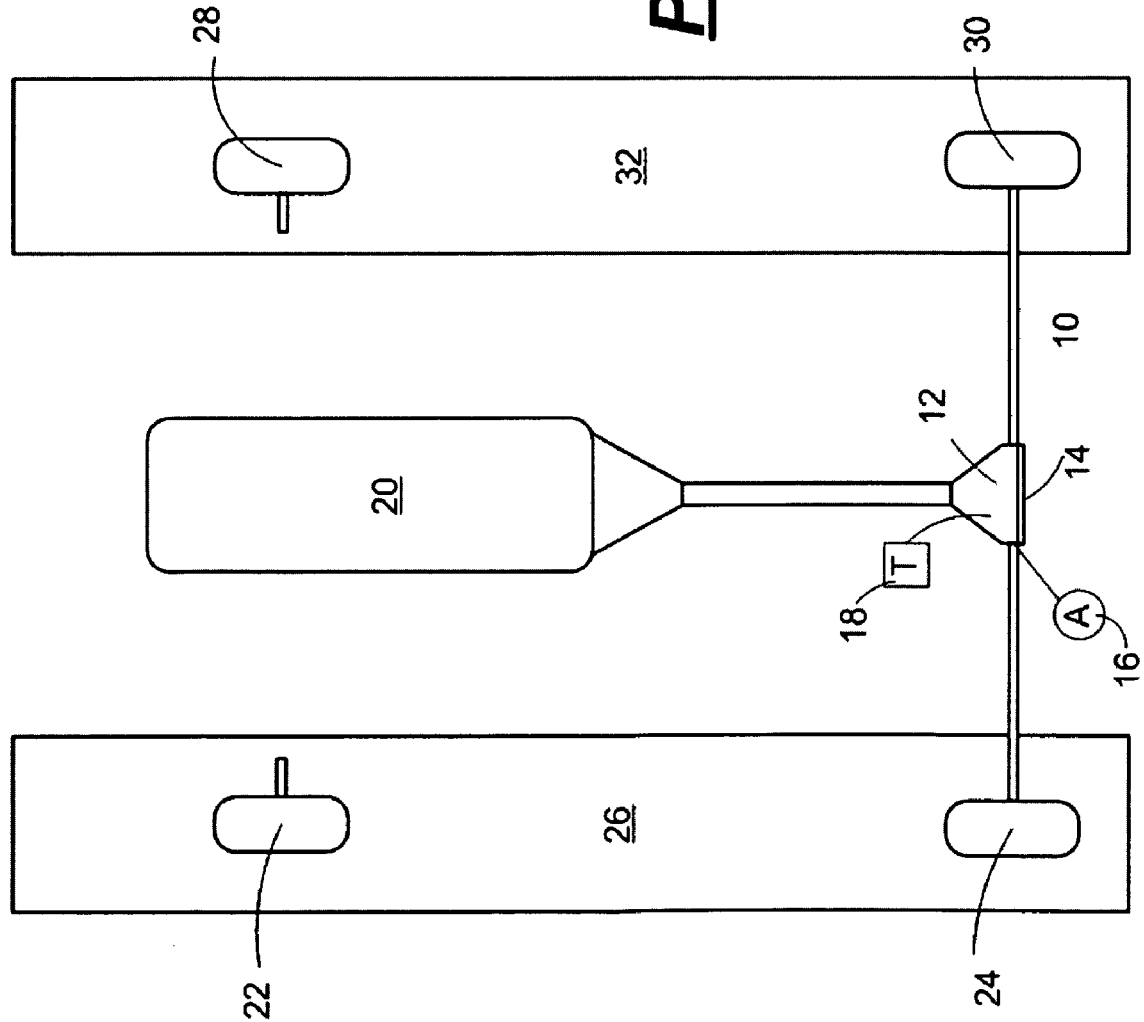
FIG. 1 is a plan schematic view of a limited slip differential for a two-wheel drive vehicle and a prior art performance test apparatus.

Full-Scale Vehicle Axle Performance Test Procedure:

With reference to FIG. 1, a new axle, or a freshly rebuilt axle 10, is used for each test. The axle 10 includes a differential housing 12 having a back cover plate 14.

If a new axle 10 that already contains fluid is to be rebuilt, the following procedure may be used. The back cover plate 14 for the axle 10 is removed, the fluid is drained and filtered to remove solid debris, and the filtered fluid is retained. Next the clutch pack inside the differential housing 12 is disassembled. New friction plates for the axle are presoaked for 30 minutes in an appropriate fluid and the fluid is drained from the friction plates before installing the plates in the axle 10. A recommended original equipment manufacture (OEM) service procedure is used to install test clutch packs in the axle 10.

The original sealant for the back cover plate 14 is removed and replaced with fresh sealant. Then the back cover plate 14 is reinstalled on the axle 10. The sealant is allowed to cure for four hours before contacting the lubricant. Next a test lubricant is charged to the axle 10 along with any solid debris that was filtered out of the fluid initially. This concludes the axle 10 rebuild procedure.

The following procedure may be used for a new or rebuilt axle 10 as described above. Accelerometers 16 are mounted to a pinion area of the differential housing 12. Thermocouples 18 are mounted through a bottom fill plug in the differential housing 12 to monitor bulk fluid temperature. The axle 10 is then mounted into a vehicle 20 for testing.

A performance test conducted on the vehicle 20 consists of a series of test cycles. Each test cycle consists of 20 split μ events and 20 miles of combination city/highway driving. The split μ events take place with a left front wheel 22 and a left rear wheel 24 adjoining a high impact, thermoplastic polycarbonate pad 26 such as a pad made from a polymeric material available from GE Plastics under the trade name LEXAN. Right side wheels 28 and 30 adjoin asphalt 32. The left side wheels 22 and 24 traverse a soapy pad before rolling onto the polycarbonate pad 26. Further lubrication is provided by water that is constantly wetting the polycarbonate pad 26 during the test.

Split μ events consist of an acceleration during which a throttle position is maintained in the range of 20-35%. Approximately 40 feet of polycarbonate pad 26 is traversed during each event. The vehicle 20 is then driven directly back to the front of the polycarbonate pad 26 for another split μ event.

After conducting the split μ event, the over-the-road driving circuit is conducted. The driving circuit consists of a combination of highway and city driving which occurs after each set of 20 split μ events. The driving circuit totals about 20 miles. Normally, four to six test cycles are conducted for each performance test.

Performance Test Evaluation Procedure

Shudder tendency for the differential takes place at the end of the test cycles for each performance test. The vehicle 20 is driven through a series of sharp turns that either start at rest or start at a very low speed. Data logging takes place during the shudder tendency evaluations. A data logger is used to store fluid temperature, half shaft speeds, and vibration data.

Dry Sump Test Procedure

Figure 2:
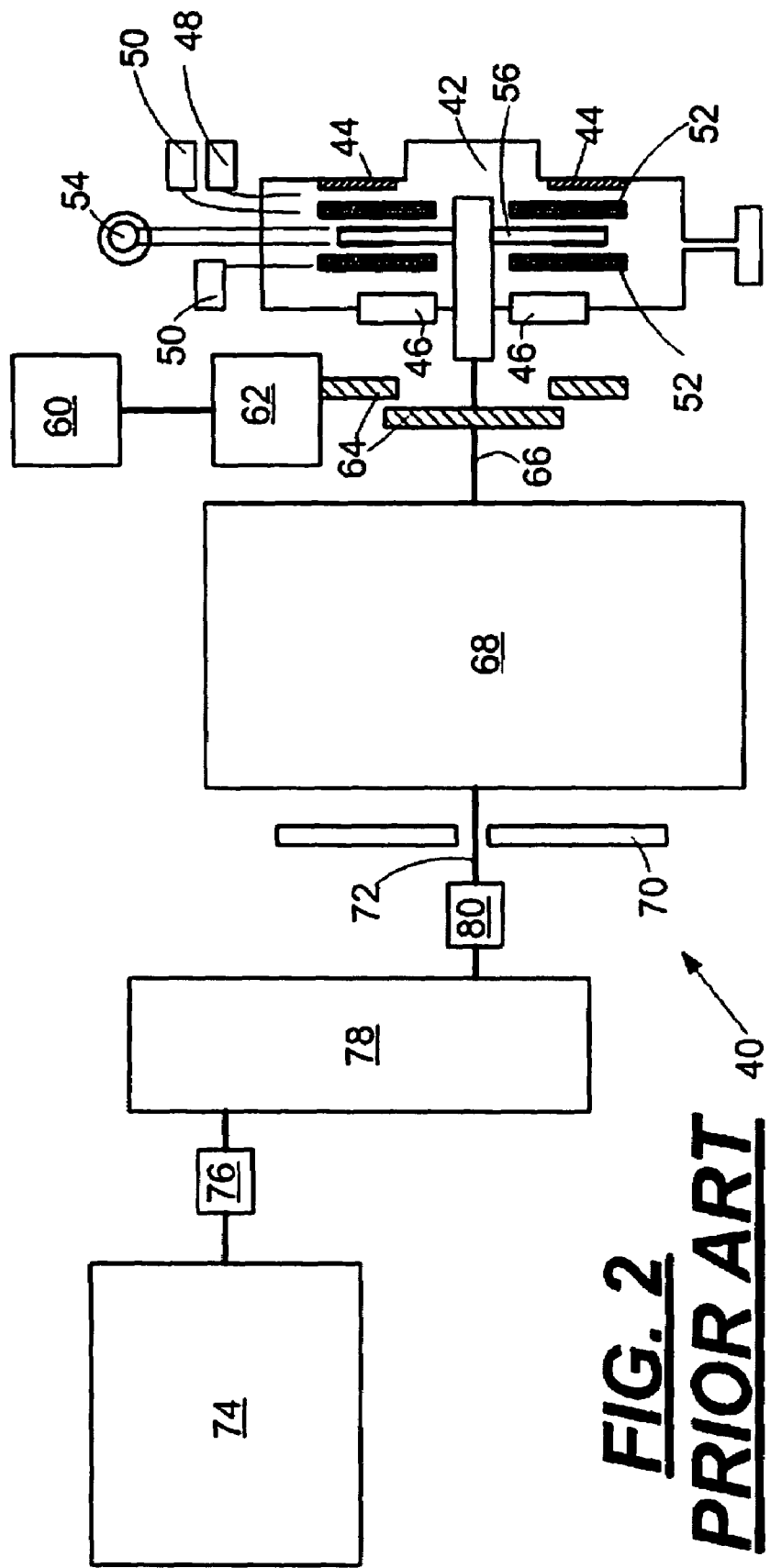
FIG. 2 is a schematic view of a friction testing apparatus for simulating a friction test for a limited slip differential according to the disclosure.

Subsequent to the above testing procedures, the axle 10 is removed from the vehicle 20. The fluid is then drained and the clutch packs are removed from the axle 10. The clutch pack is friction mapped by installation into the friction testing machine 40 (FIG. 2). The mapping takes place in a dry sump without added fluid. Fluid removed from the axle 10 is submitted for metals analysis, viscosity, water content, and Total Acid Number.

The friction testing machine 40 used for the post test procedure and for the split μ simulation test procedure described below is a modified SAE No. 2 friction testing machine 40 as described in U.S. Pat. Nos. 5,372,735 and 5,441,656. The machine 40 includes a clutch pack housing 42, spacers 44 inside the housing 42, and air pistons 46 for applying pressure or load to the clutch pack. Thermocouple 48 provides an oil temperature measurement (when a lubricant is used), and thermocouples 50 provide temperature measurements of steel clutch plates 52. A load cell or strain gauge 54 provides friction force applied to the friction disk 56 at a selected temperature, load, and sliding speed. As indicated in SAE Paper #940821, the coefficient of friction μ may be computed from the load cell data by the following equation:

$$\mu = \frac{T}{P_p \cdot A_p \cdot Rm \cdot n}$$

where, T is torque in N·m, $P_p$ is pressure applied to the SAE No. 2 machine apply piston in kilopascals, $A_p$ is the area of the apply piston in m², Rm is the effective mean radius of the friction disks, and n is the number of friction plate surfaces. A fluid heating unit 58 provides control of the temperature of the fluid in the housing 42.

A static alternating current motor 60 and speed reducer 62 are attached to a worm gear drive 64 for a motor shaft extension 66 and is used to measure a static breakaway coefficient of friction ($\mu_s$) at very low speed (typically less than 5 rpm). Rotation of the friction disks 56 is provided by a 3600 rpm alternating current motor 68. A removable flywheel 70 may be attached to the motor shaft 72. A variable speed direct current (DC) motor 74 is coupled by use of shaft coupling 76 to a speed reducer 78, which in turn is coupled to the motor shaft 72 by use of shaft coupling 80. The DC motor 74, couplings 76 and 80, and speed reducer 78 represent a modification to the standard SAE No. 2 friction testing machine.

In some cases, measurement of the coefficient of friction at a low sliding speed under controlled temperature and load conditions requires more torque than can be provided by alternating current motors 60 and 68. Accordingly, the DC motor 74 and speed reducer 78 capable of producing 300 N-meters torque at 1 rpm are attached to the machine 40 and are connected through the coupling 76 and 80 to the de-energized 3600 rpm motor 68.

A measure of start-up shudder tendency for limited slip differentials for the axle 10 described above, is provided by the following test procedure. The start-up condition for the differential is where the clutch pack has been held above the lubricant fluid in a compressed state for several hours.

Prior to conducting the friction mapping cycles, the clutch pack housing is equilibrated to the appropriate temperature, normally in the range of from about 10° C. to about 140° C. Friction mapping is conducted while applying pressures ranging from about 100 to about 900 kilopascals to the clutch pack through piston 46 using temperatures in the above-specified range.

As will be appreciated, the full scale vehicle testing of limited slip differentials involves significant time, and space to complete the testing cycles. Embodiments described herein, however, may eliminate the need for split μ vehicle testing while providing close simulation of split μ vehicle test results. In the embodiments described herein, the clutch packs are aged so that their friction maps correspond closely with the friction maps provided by clutch packs from the split μ vehicle test described above.

Split μ Simulation

In one embodiment, there is provided a friction testing protocol that may be performed on any suitable friction test equipment capable of holding limited slip friction clutch packs. The friction test equipment is suitably configured to measure and control, rotational speed, interfacial plate temperature, torque (and/or coefficient of friction), and applied pressure. The procedure emulates the split-μ event that occurs in a vehicle's rear axle 10 during conditions of large differential speed bias between wheel 24 and wheel 30 (FIG. 1). Typical conditions are 1500 rpm, about 330 kilopascals pressure, and six second duration. Each of these six-second events is called a cycle. The test procedure usually contains a number of such cycles that can range from 20 to over 1000. After a series of cycles, the friction characteristics of the clutch pack are conveniently checked on the same test rig or on another test rig capable of slow speed friction/torque evaluations according to the Dry Sump Procedure described above.

Split μ Simulation Test Procedure Limited Slip Clutch Pack Testing

A purpose of the following test procedure is to simulate the conditions under which clutch packs in limited slip axles degrade during a split μ vehicle test. Such degradation can lead to start-up shudder in certain vehicles that tend to transmit vibrations originating in the differential to the driver.

In preparation for the simulation test, the friction plates in a limited slip clutch pack from, for example an axle containing a 25 centimeter ring gear, are dipped in a limited slip top treat fluid, such as that manufactured by D. A. Stuart Company and sold under the trade name of STURACO, for about thirty minutes at room temperature. The plates of the clutch pack are then reassembled onto the spline of a spider gear and are compressed with from about 100 to about 200 kilograms force for from about two to about four hours in a vice or other suitable device, including a test head of a friction testing machine. After compressing the clutch pack, the clutch pack is removed from the compressed state and is mounted in the friction testing machine 40, unless already present in the friction testing machine.

A pressure sufficient to apply from about 300 to about 350 kilopascals on the friction plates 56 is applied using air pistons 46 to the clutch pack housing 42. Such amount of pressure assumes a solid contact between the friction and steel plates 56 and 52 with a contact area of about 47 square centimeters. At this pressure, the minimum amount of a test fluid is introduced into the housing to allow for safe operation of the test equipment. The amount of test fluid should be minimized and should be maintained at no higher than ⅓ coverage of the friction plate 56.

Motor 68 is energized and to rotate the shaft 66 and provide a relative rotational speed between friction pate 56 and steel plates 52 of about 1500 rpm. An appropriate pressure is then applied to the clutch pack. Each rotation and pressure cycle is conducted for about seven seconds. During the cycle, the interfacial plate temperature and the sump temperature are monitored using thermocouples 48 and 50 (FIG. 2).

Each rotation cycle, a dynamic stop cycle is executed by interrupting the power to the drive motor 68 so that the plates 52 and 56 stop rotating. The rotation and stop cycles are repeated for predetermined number of cycles, typically from about 60 to about 1000 cycles. The test fluid is then drained from the friction tester 40.

Friction mapping using the Dry Sump Procedure, as described above, is used to characterize the friction characteristics of the clutch pack as a function of temperature.

The following non-limiting examples are provided for illustrating various aspects of the embodiments described herein and are not intended to limit the disclosure. In the examples, the following abbreviations are used:

Gear Oil 1 (GO1)—a 75W90 gear oil with GL-5 performance characteristics
Top Treat 1 (TT1)—a limited slip top treat for axle oil
The graphs use the following legend:
A—coefficient of friction (×1000)
B—midpoint torque
C—peak torque
D—bulk fluid temperature
E—center rear plate temperature
F—rear plate temperature
G—torque
H—friction coefficient
I—rpm
J—plate 3 temperature
K—plate 5 temperature
L—up sweep data
M—down sweep data

EXAMPLE 1

GO1/TT1 Pack with Paper Friction Plates

In this example a Gear Oil 1 and a Top Treat 1 oil (GO1/TT1) were used. The fluid was a fuel efficient 75W90GL-5 quality gear lubricant and the top treat axle oil was a limited slip top treat fluid. The friction plates in the clutch pack were RAYBESTOS 7901-4 Paper. Operational parameters for 60 split μ simulation cycles were determined using the friction testing machine 40 described above.

Figure 3:
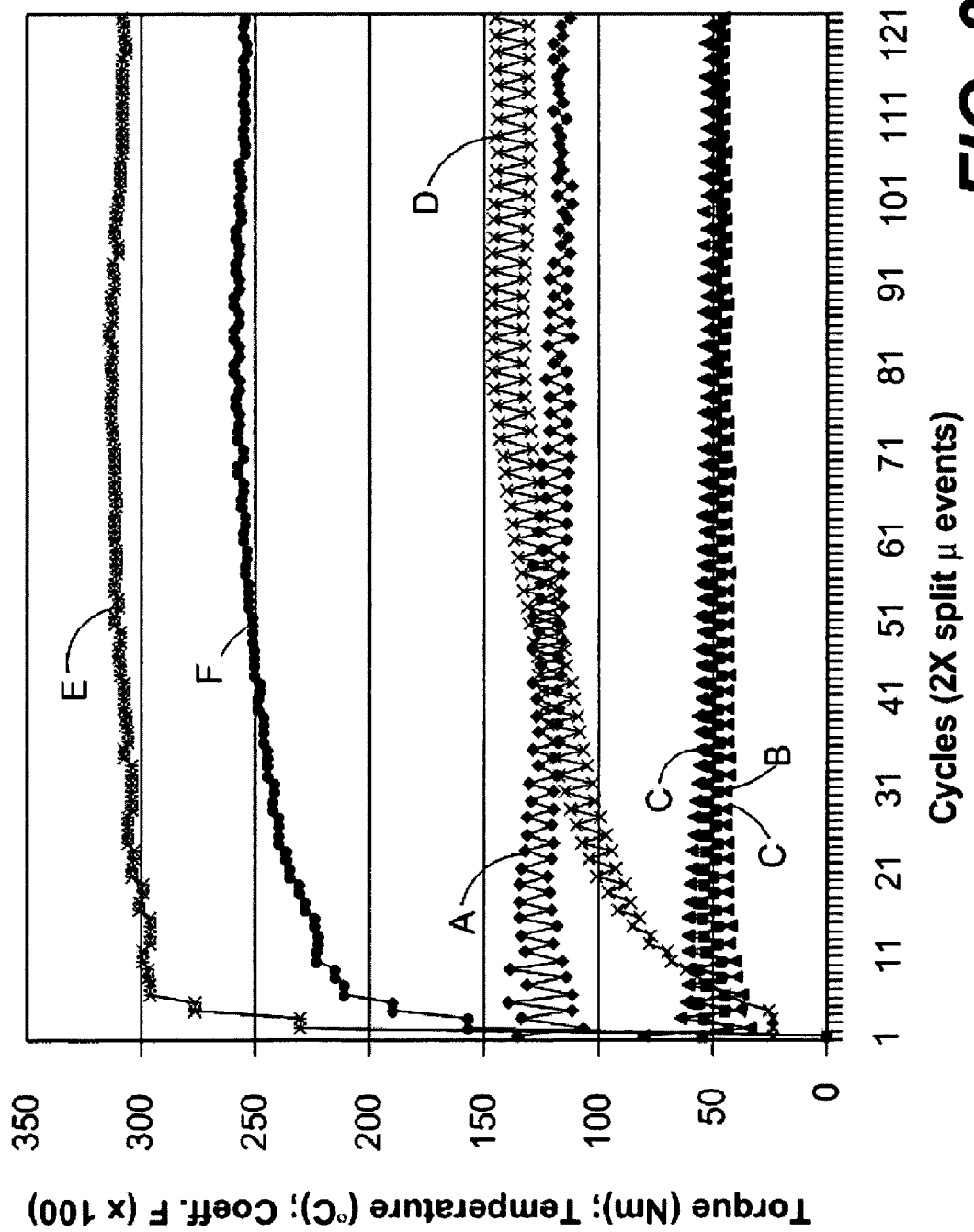
FIG. 3 is a summary graph of composite results for spilt μ simulation cycles using a procedure as described herein.

FIG. 3 provides a summary graph of the simulation results for the operation and stop cycles (two times the split μ simulation cycles) for the foregoing fluids and clutch pack.

In FIG. 3, curve A is the observed coefficient of friction (×100). Curve B is the midpoint torque. Curve C is the peak torque. Curve D is the bulk fluid temperature as measured by thermocouple 48. Curve E is the center interfacial plate temperature and Curve F is the rear interfacial plate temperature as determined by thermocouple 50. Curves E and F show a rapid rise in interfacial plate temperature to a level that is maintained relatively steady throughout the test.

Figure 4:
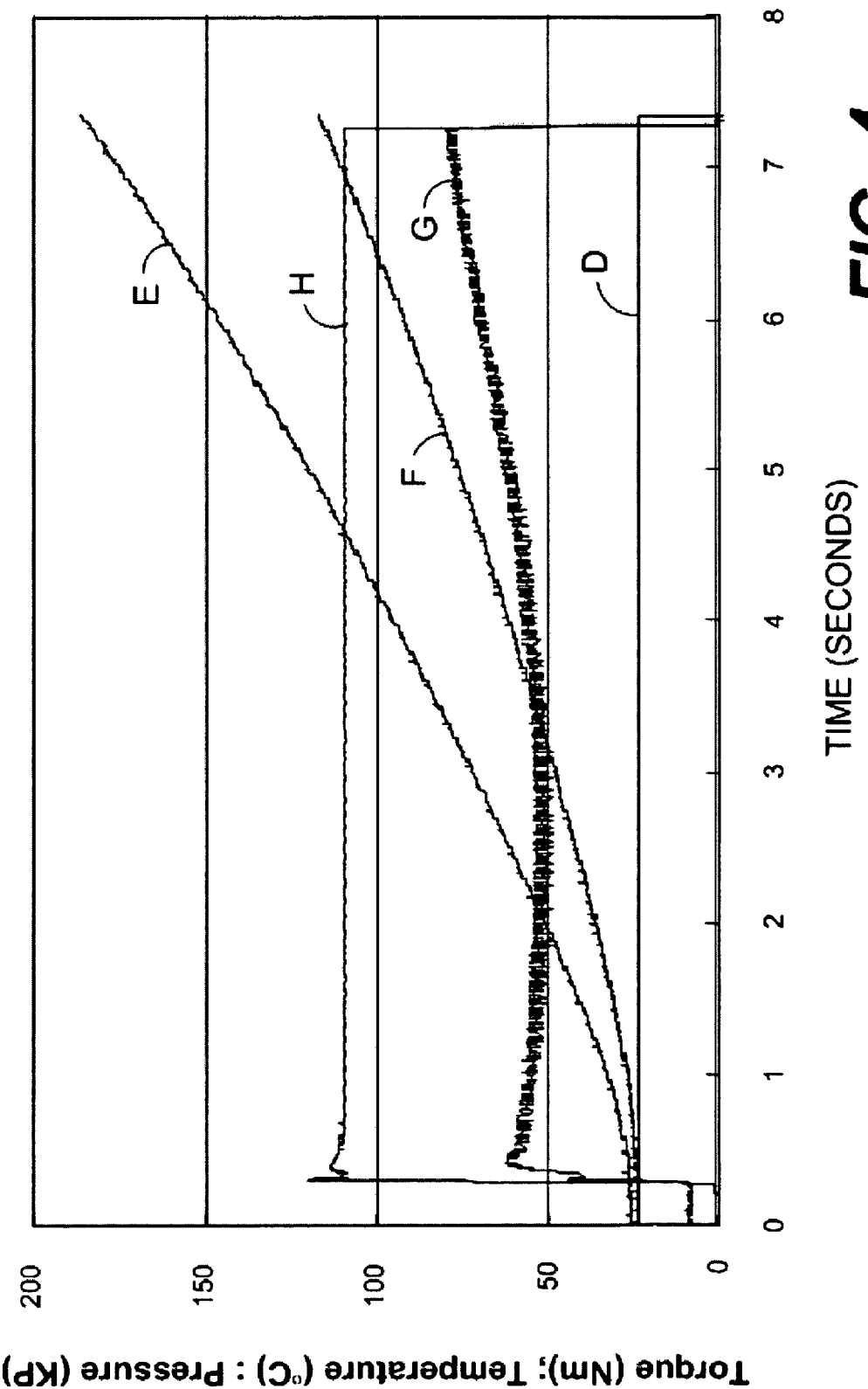
FIG. 4 is a graph of temperature, pressure, and torque during a split μ simulation cycle according to the disclosure.

FIG. 4 is a graph of temperature, pressure and torque during a first split μ simulation cycle. In FIG. 4, curves D, E, and F are as described above. Curve G was the measured torque and curve H was the pressure applied to the clutch pack housing 42. As seen in FIG. 4, there was a rapid rise in interfacial plate temperatures (curves E and F), but little change in the bulk fluid temperature (curve D).

The foregoing example provided a baseline run that demonstrated very high interfacial clutch plate temperatures which may be the cause of clutch plate degradation.

EXAMPLE 2

GO1/TT1 with Paper Friction Plates

Figure 5:
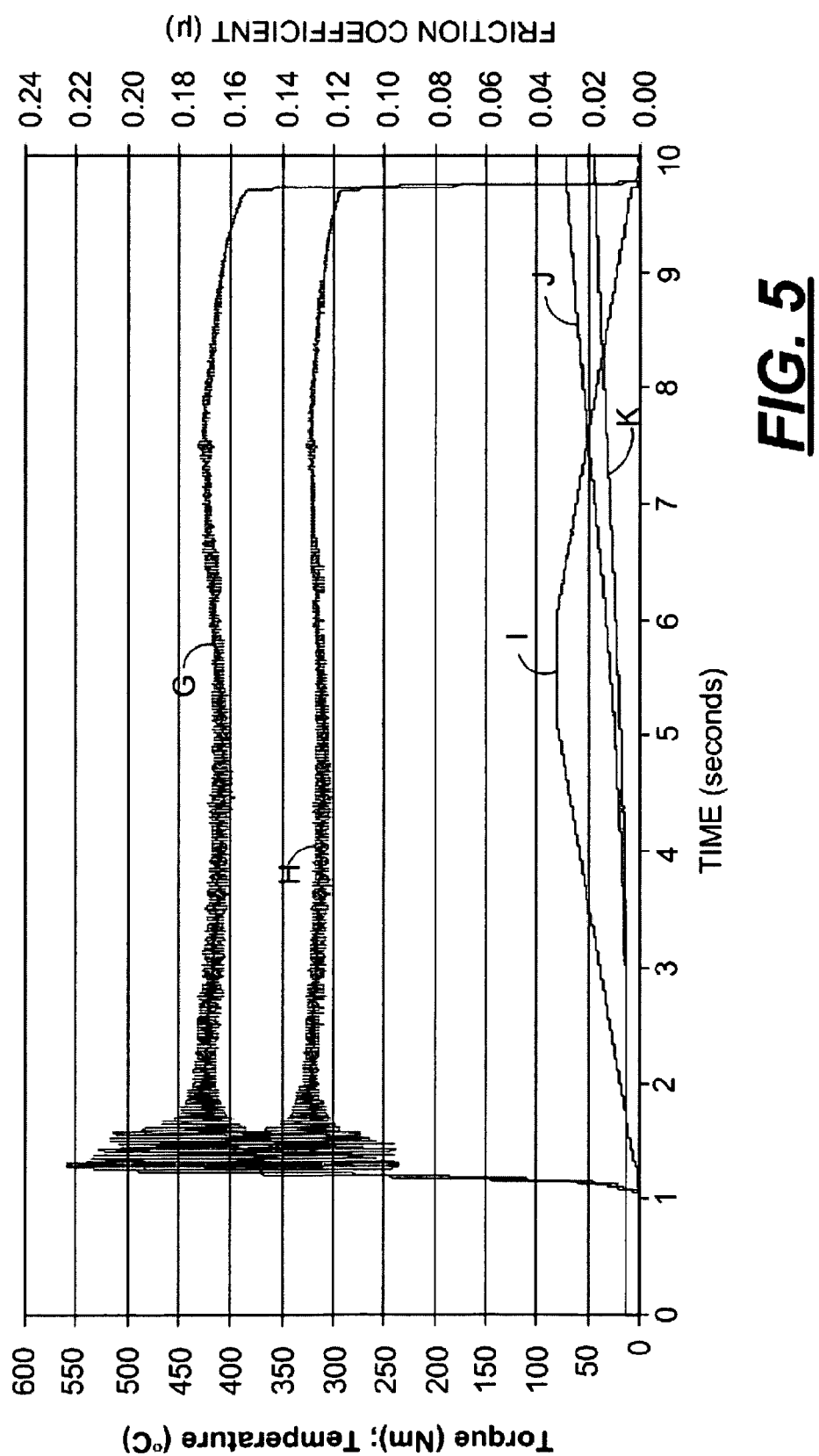
FIGS. 5 and 6 are graphs of torque, temperature, and coefficient of friction versus time for split μ simulation cycles according to the disclosure.
Figure 6:
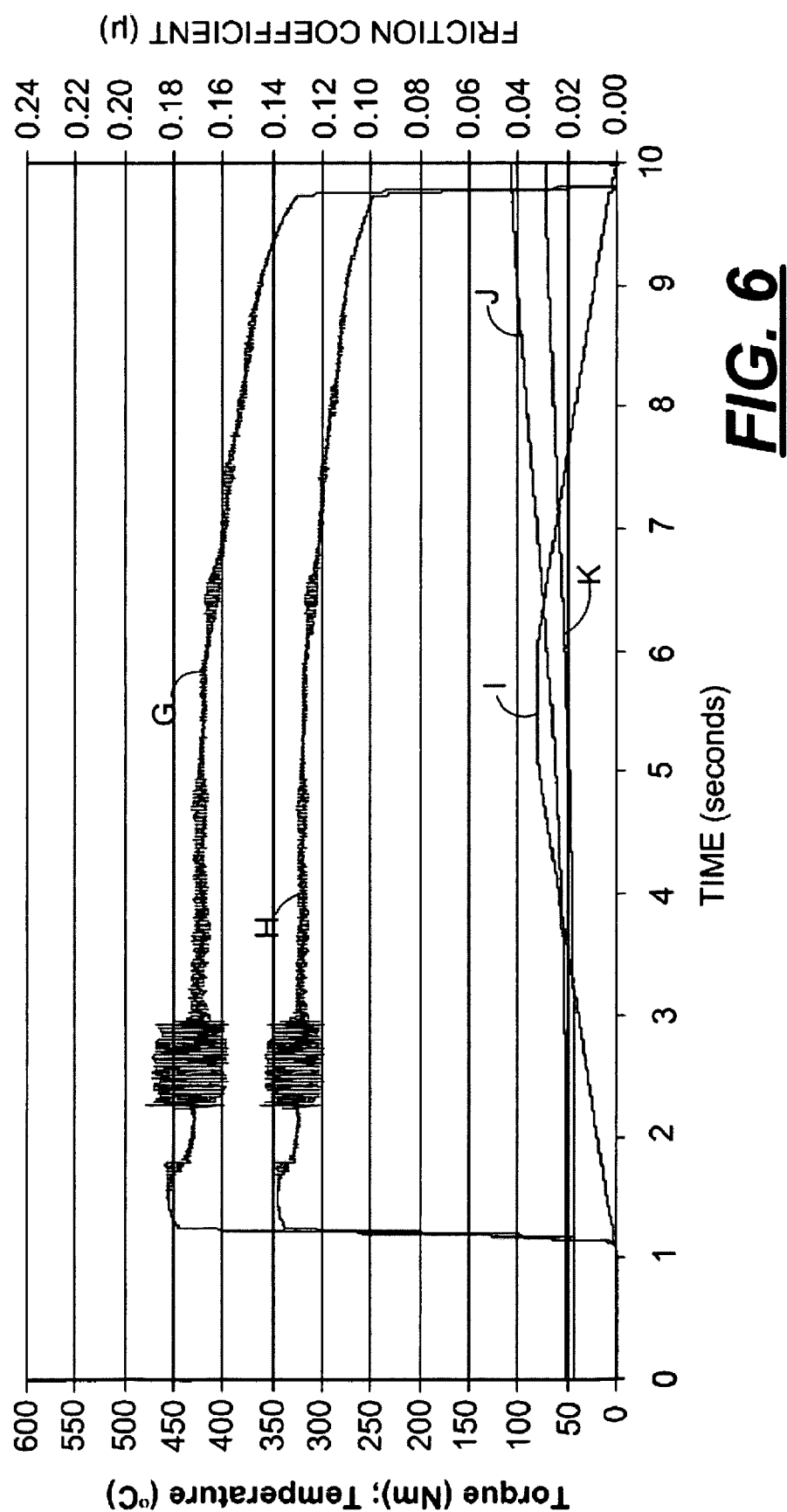
Figure 7:
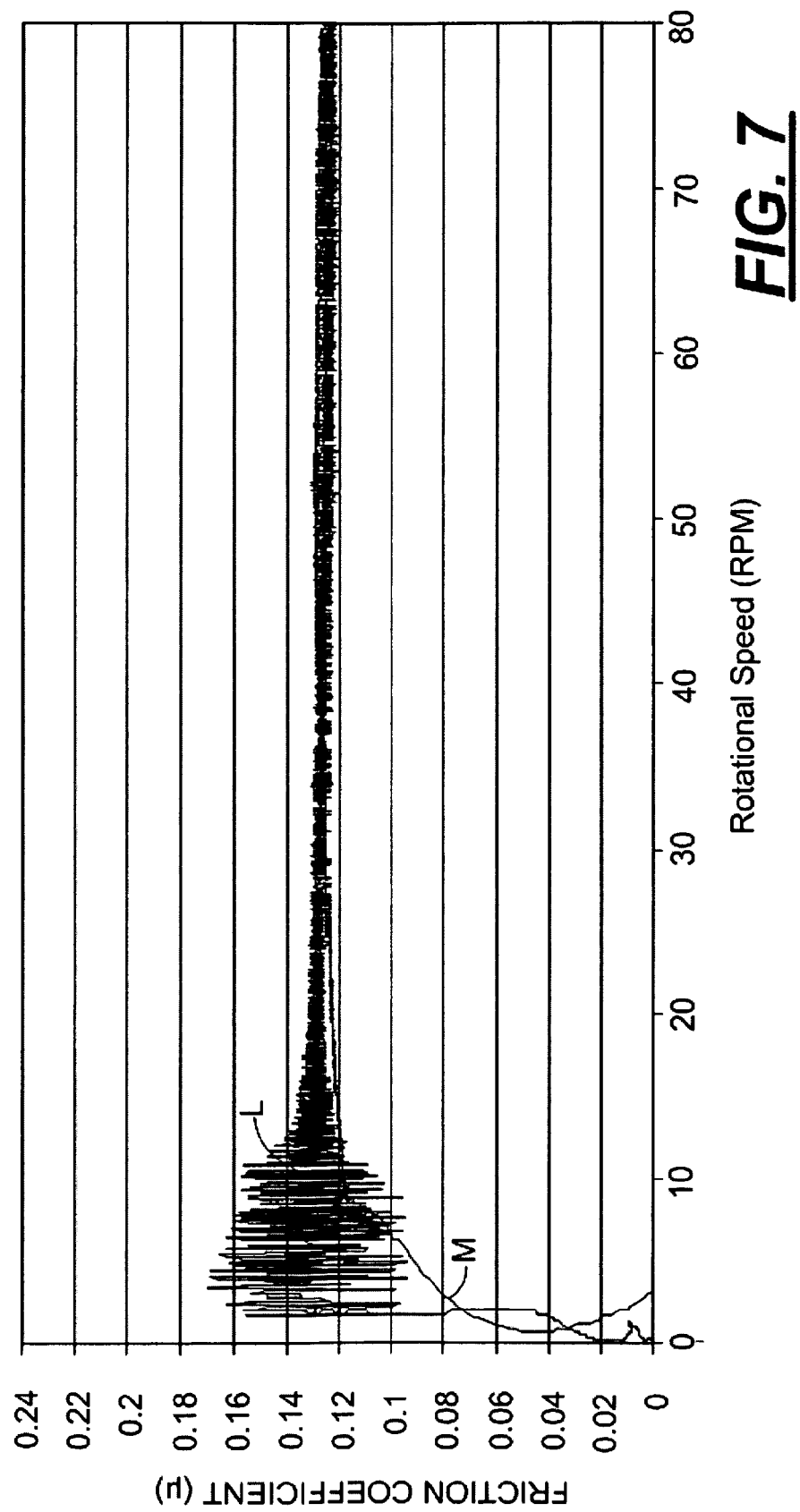
FIGS. 7 and 8 are graphs of coefficient of friction versus rotational speed for split μ simulation cycles according to the disclosure.
Figure 8:
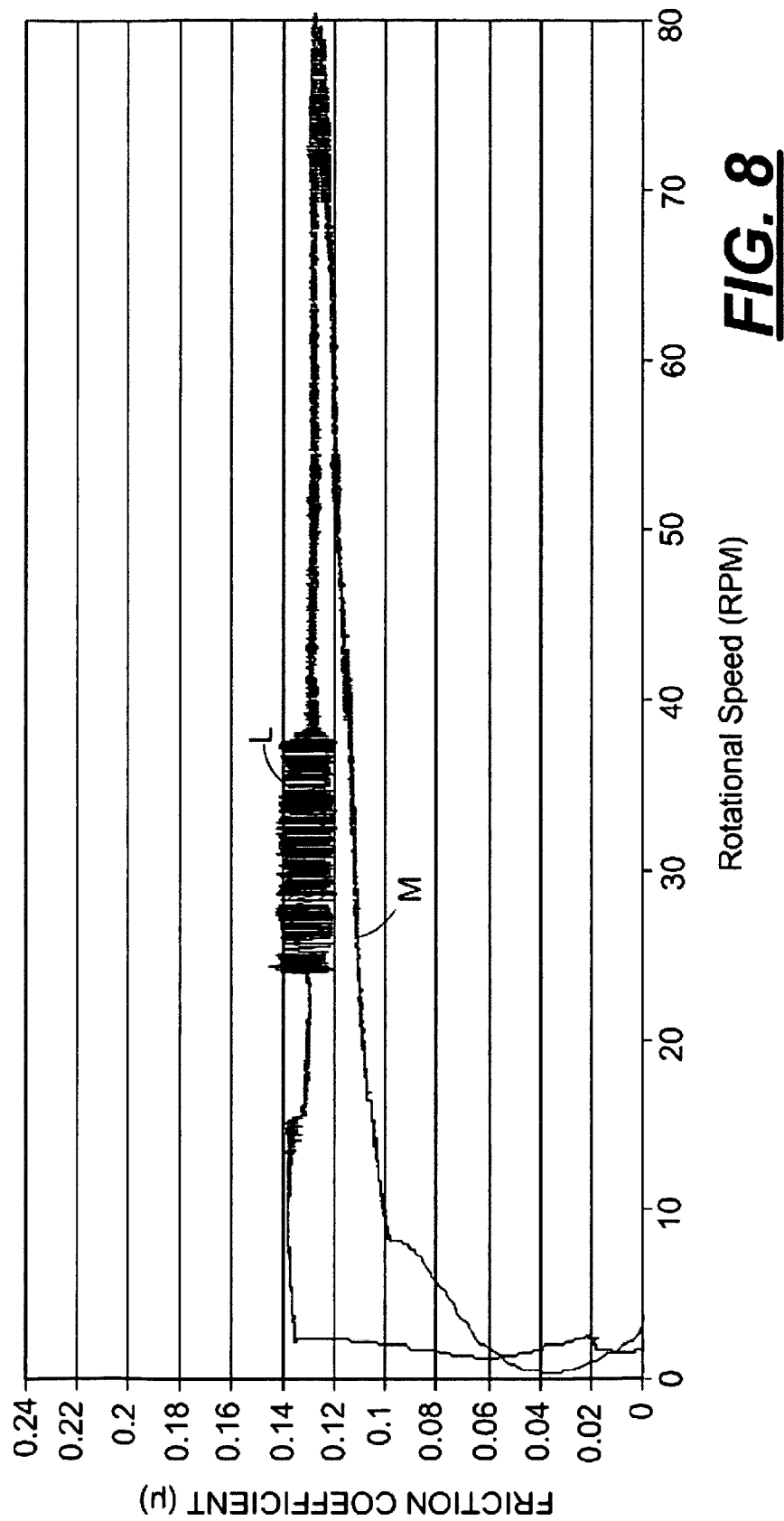
Figure 9:
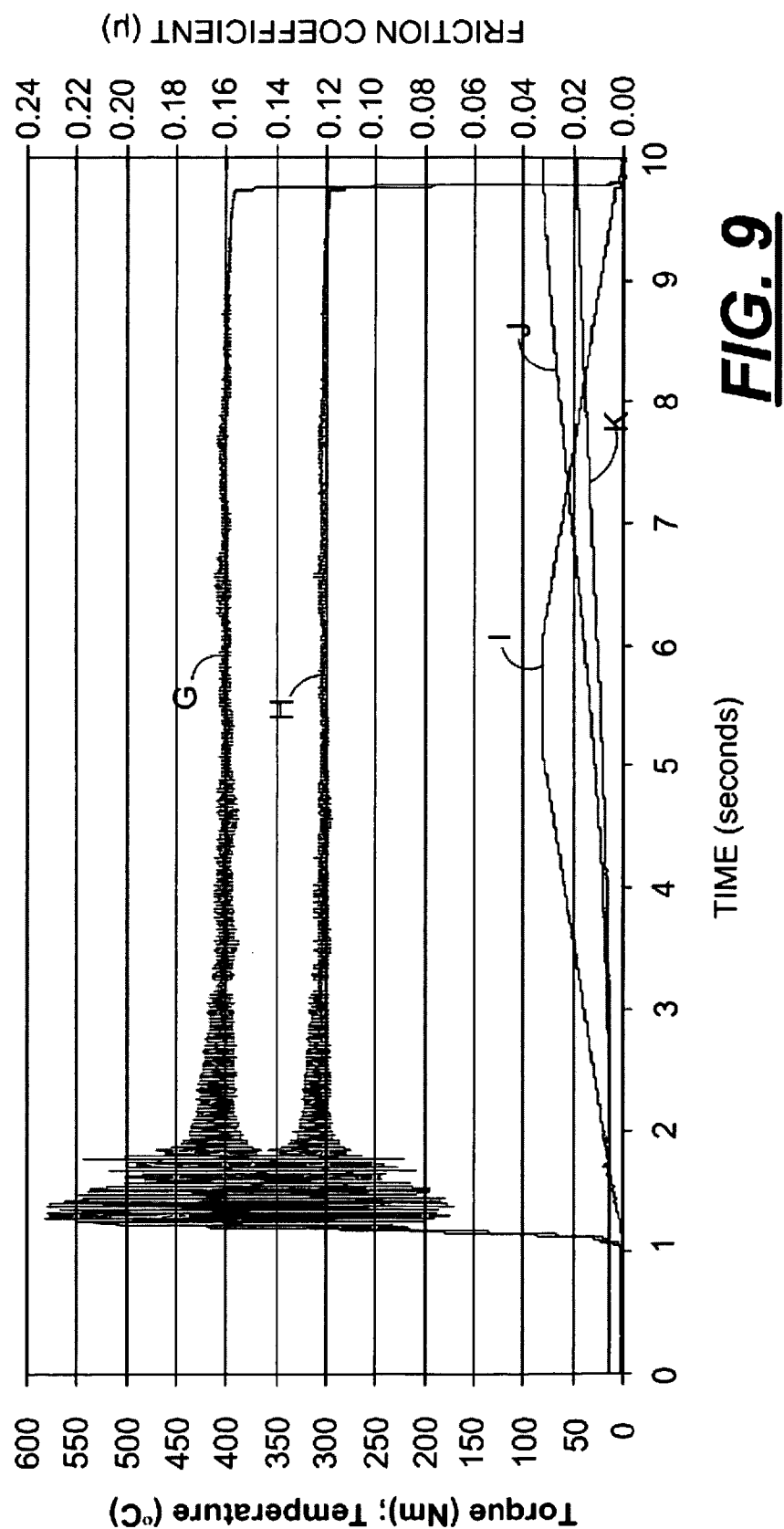
FIGS. 9-12 are friction mapping graphs according to the disclosure on a clutch pack that was aged using a split μ vehicle test.
Figure 10:
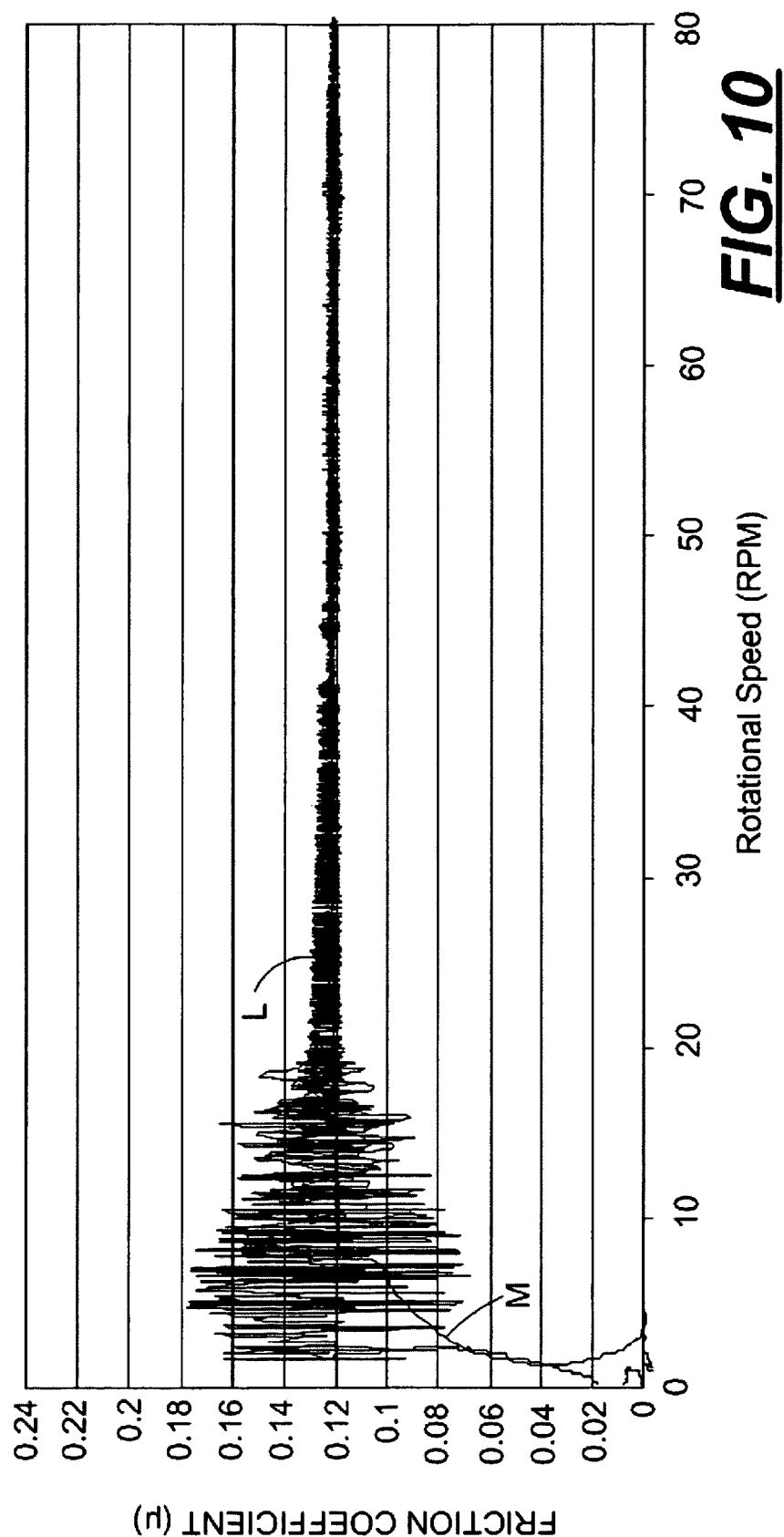
Figure 11:
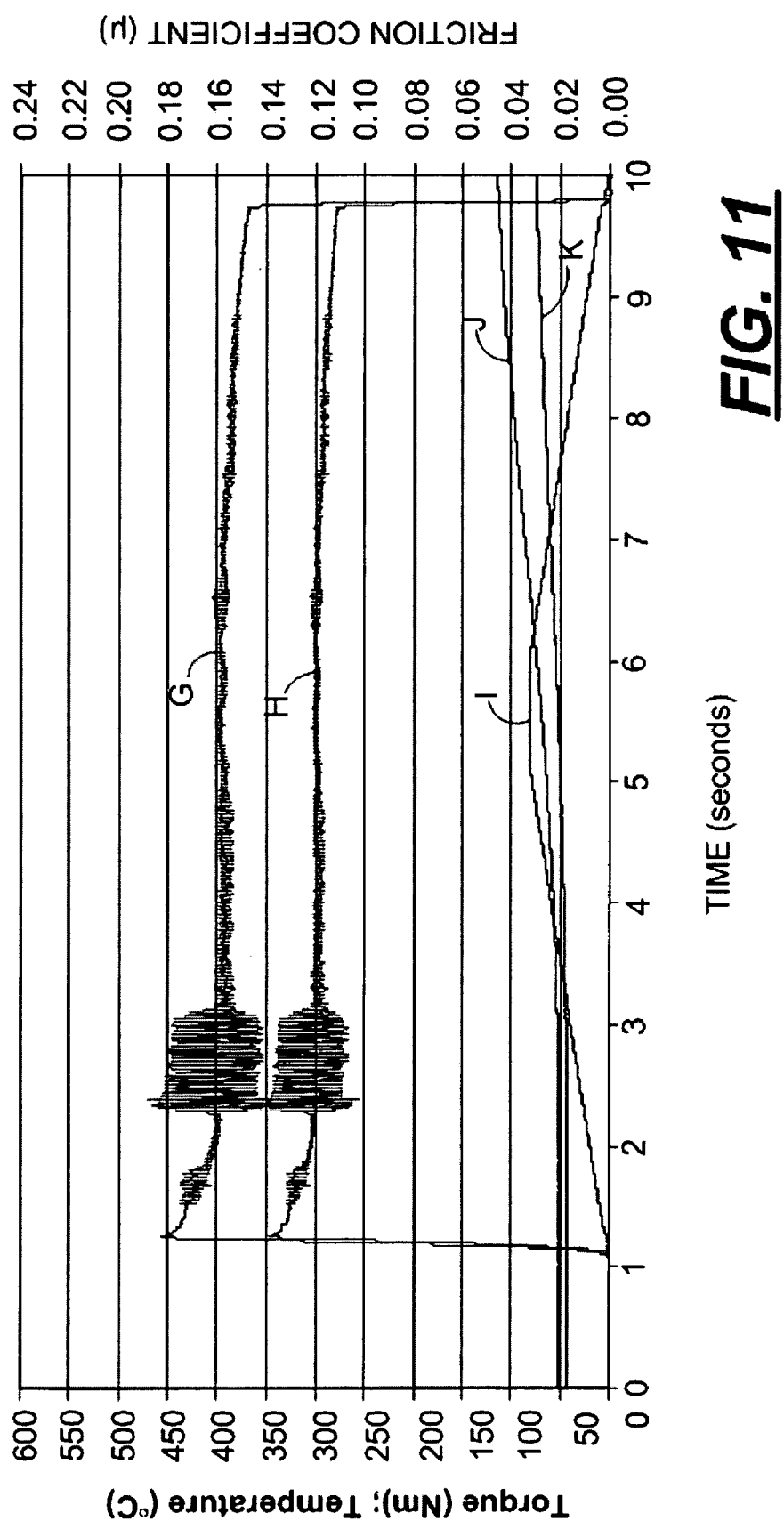
Figure 12:
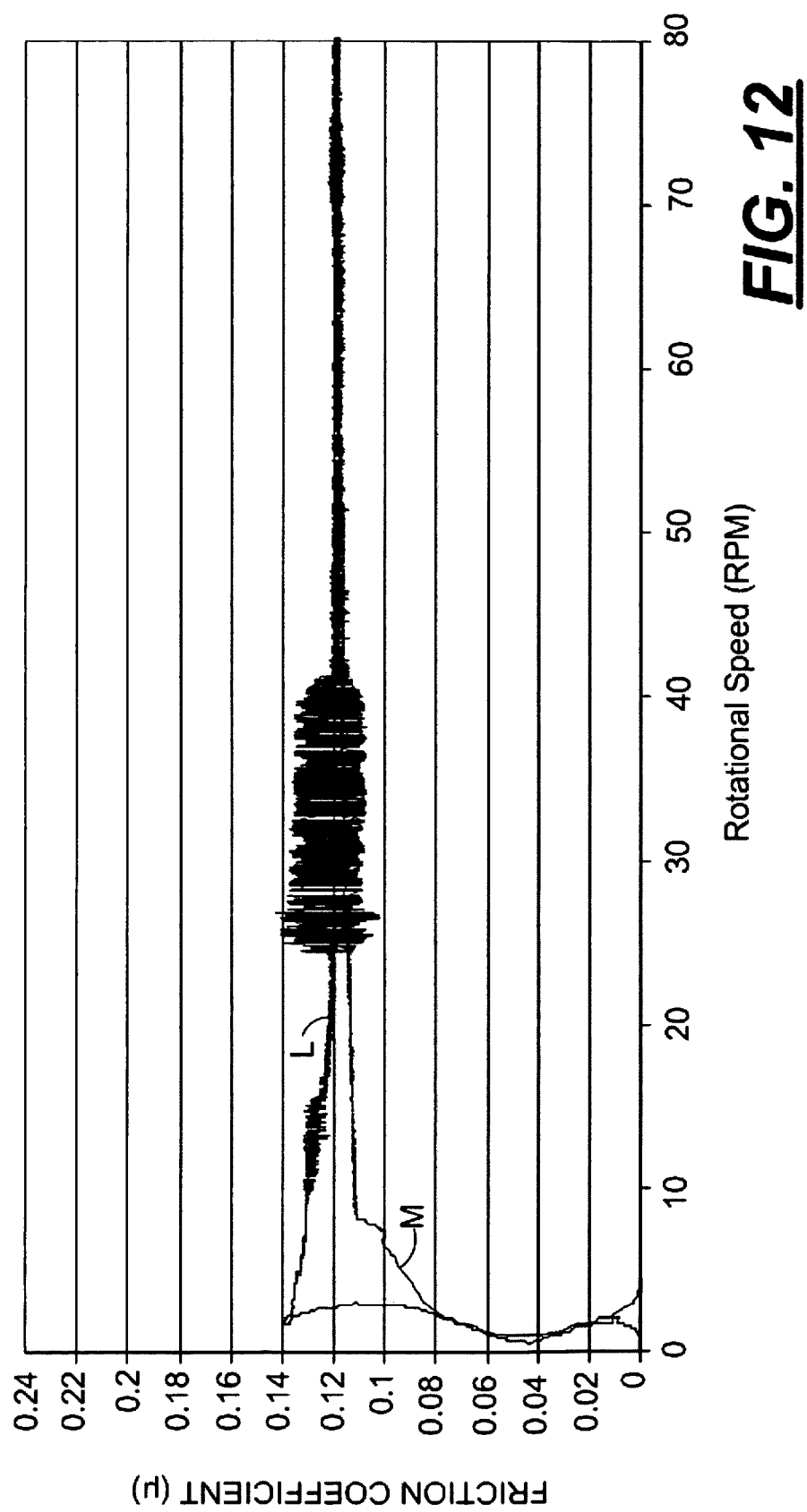

In this example, fluids and friction plates as described in Example 1 were used. For this example, friction maps from 60 split μ simulation cycles were compared to 80 split μ vehicle tests as described with respect to FIG. 1. Friction maps from the simulation and the vehicle test show very similar tendencies for shudder. FIGS. 5 and 6 are graphs of torque and temperature versus time for simulation runs at 10° C. and 40° C. respectively at 900 kilopascals pressure. FIGS. 7 and 8 are graphs of the coefficient of friction for the simulation runs at 10° C. and 40° C. respectively at 900 kilopascals pressure, but these graphs show data plotted as a function of rotational speed. FIGS. 9-12 are the corresponding friction mapping graphs obtained by testing clutch packs from split μ vehicle tests at 900 kilopascals pressure and at 10° C. and 40° C. respectively. The friction mapping graphs were obtained by use of the dry sump procedure described above. As seen in FIGS. 6 and 11, the simulation test and the vehicle test at 40° C. both illustrate a negative slope induced shudder. Comparison of FIGS. 5-8 with FIGS. 9-12 illustrate that the friction maps for the simulation tests closely resemble the friction maps for the vehicle tests.

EXAMPLE 3

GO1/TT1 with Paper Friction Plates

Figure 13:
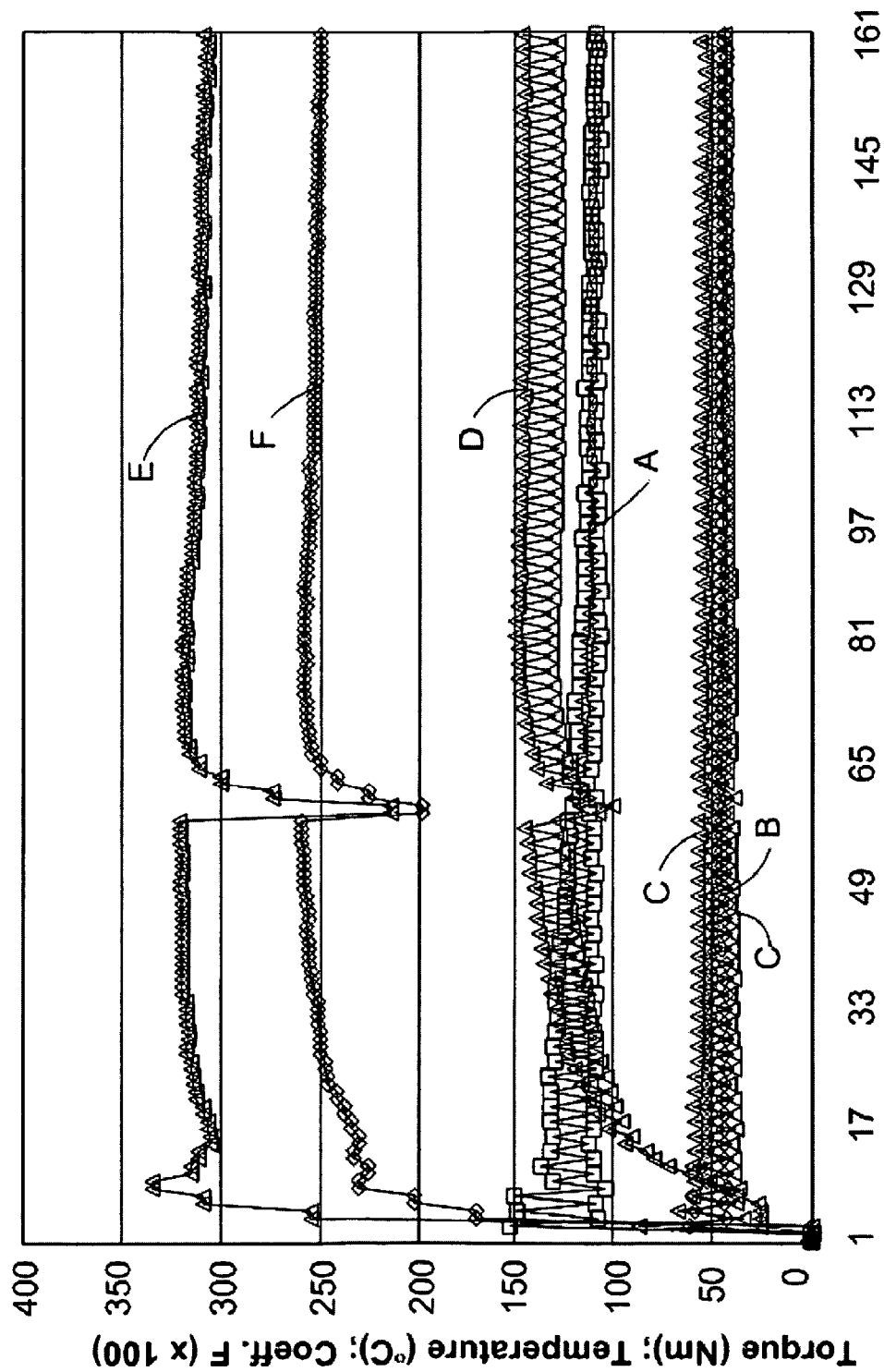
FIGS. 13-16 are summary graphs of composite results for spilt μ simulation cycles using a procedure as described herein.

In this example, 80 split μ simulation cycles were accumulated on the same types of fluids and friction plates as described in Example 1. FIG. 13 is a summary graph for the 80 split μ simulation cycles according to this example, which can be compared to the results for 60 split μ simulation cycles in FIG. 3. While a comparison of FIG. 3 with FIG. 13 indicates that the results are similar for both 60 and 80 simulation cycles, the first three engagements in FIG. 13 produced higher friction which caused higher interfacial plate temperatures. Variations of this type could be the result of differences in friction plates and steel spacers.

EXAMPLE 4

GO1/TT1 with Paper Friction Plates

Figure 14:
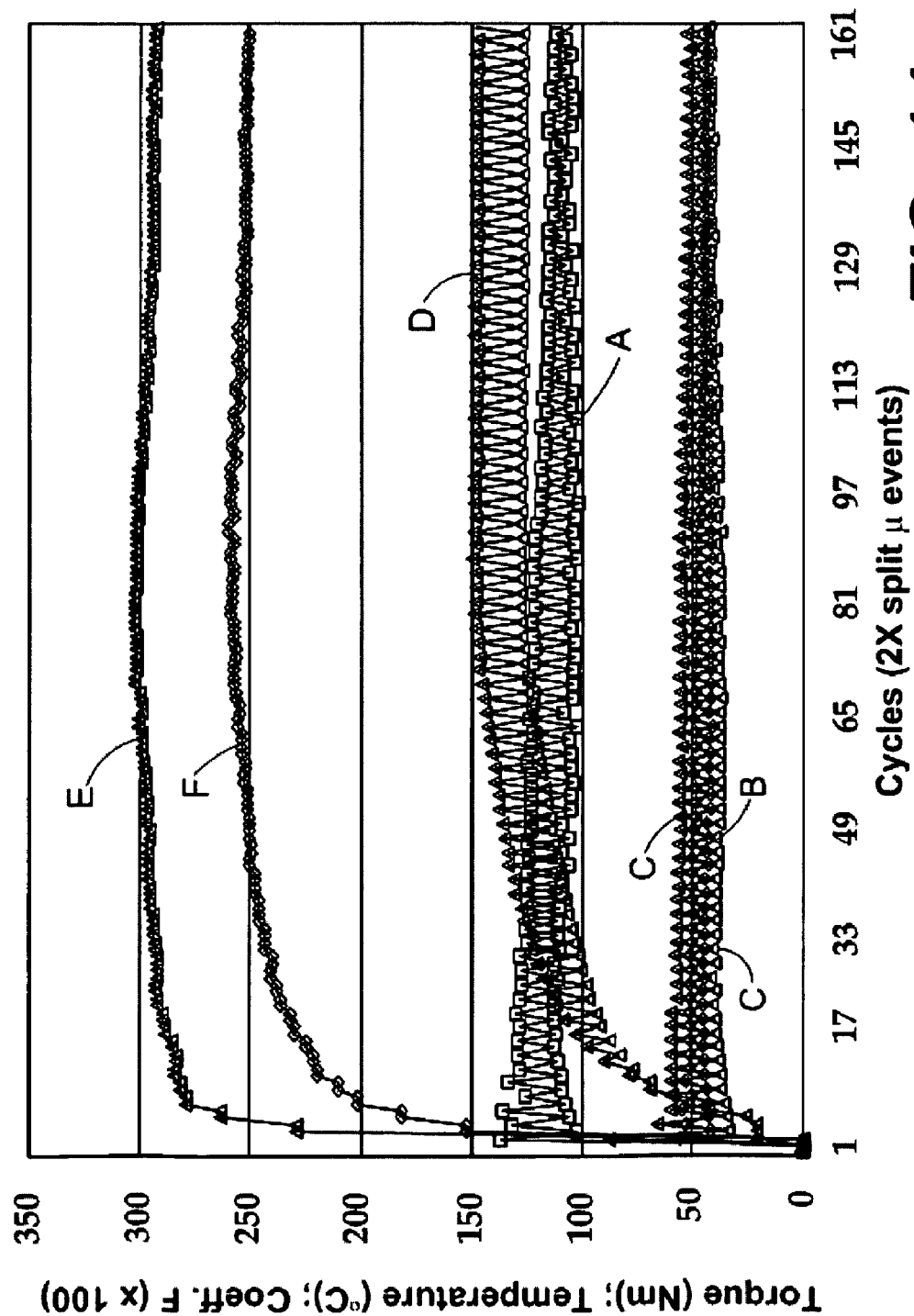

This example also used the same type of fluid and friction plates described in Example 1. In this example, 80 split μ simulation cycles were again run. A summary of the friction mapping results for the 80 split μ simulation cycles is provided in FIG. 14. This re-run of the split μ simulation compares favorably with the 60 split μ simulation of Example 1 illustrated in FIG. 3.

EXAMPLE 5

GO1/TT1 with Carbon Fiber Friction Plates

Figure 15:
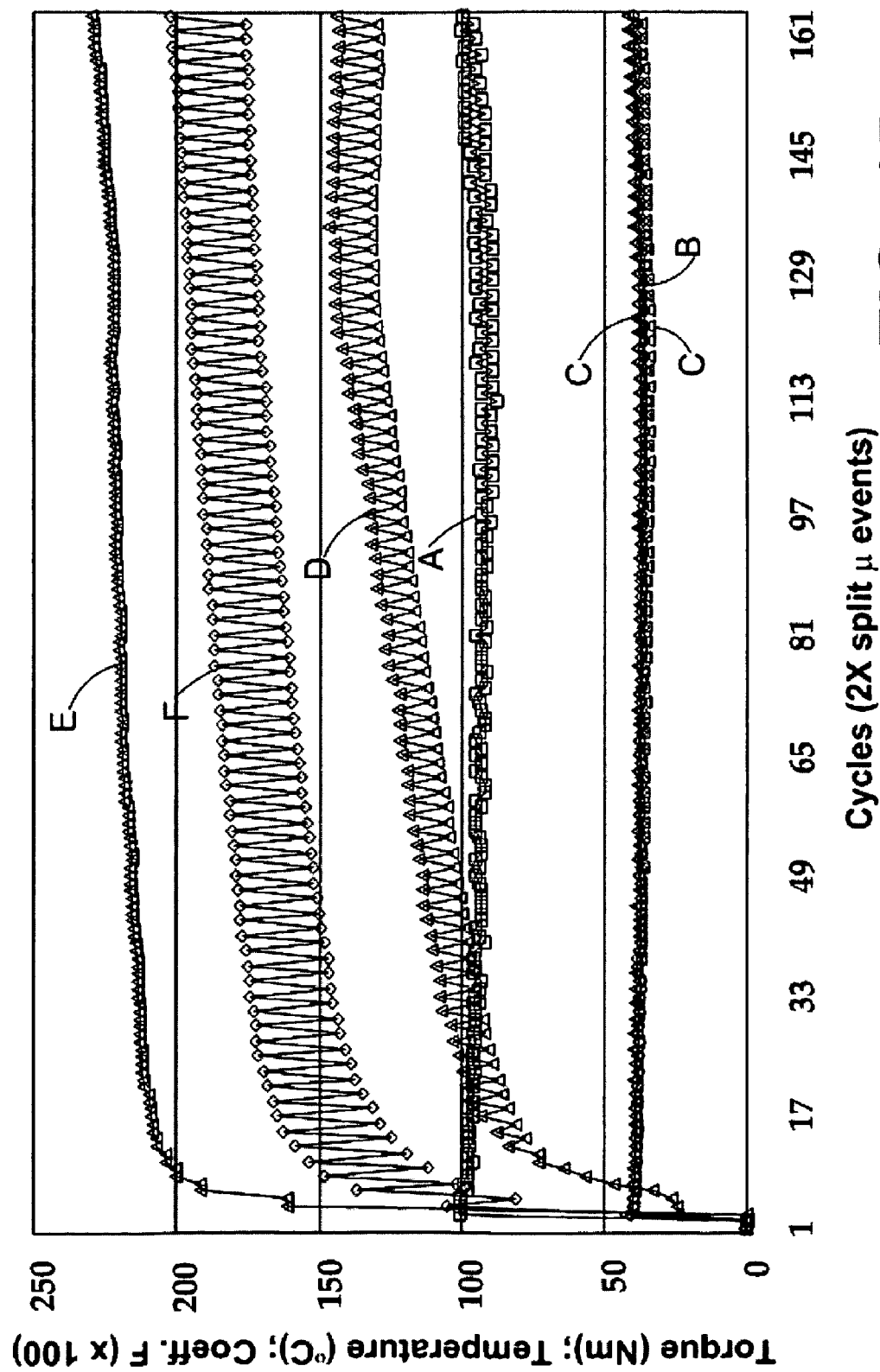

In this example, the same types of fluids described in Example 1 were used. However, the friction plates were changed to plates with woven carbon fiber friction material in order to compare the performance to that of paper friction plates used in the previous examples. FIG. 15 is a composite graph of the performance of the carbon fiber friction plates in the GO1/TT1 fluids for 80 split μ simulation cycles. Comparing FIG. 15 with FIG. 14, the interfacial plate temperatures (curves E and F) are substantially lower than the plate temperatures in FIG. 14 using paper friction plates. Likewise, the bulk fluid temperature (curve D) is somewhat lower for the carbon fiber friction plates. There appears to be more effective plate cooling as the temperature of the center rear plate (curve F) changed more dramatically over the test cycles. The simulation results provide direct evidence that lower interfacial temperatures are observed with carbon fiber friction plates which could reduce deterioration of the fluid/clutch system.

EXAMPLE 6

With Paper Friction Plates

Figure 16:
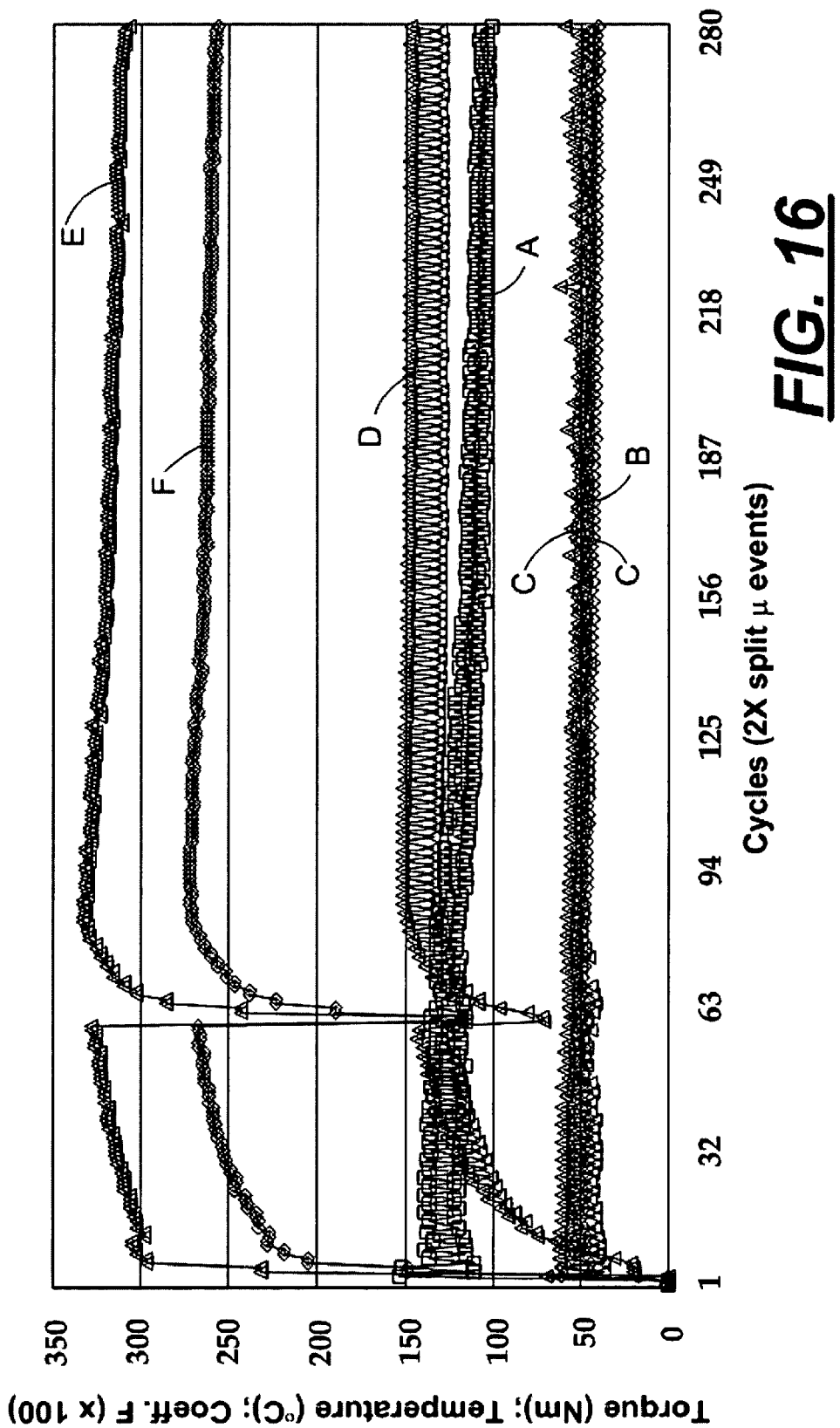
Figure 17:
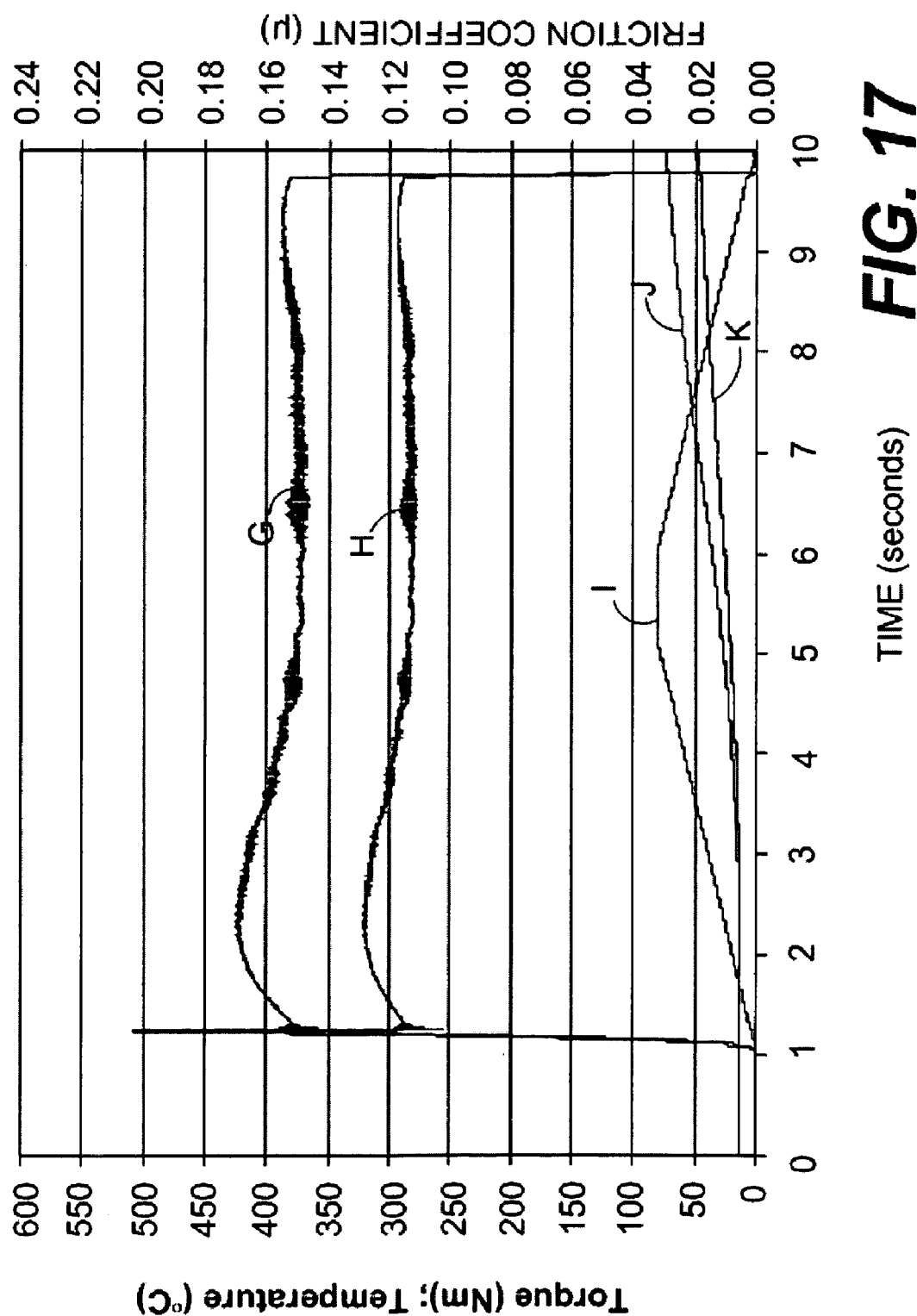
FIG. 17 is a time-domain graph of torque, temperature, and coefficient of friction versus time for dry sump friction mapping cycle on a clutch pack that was aged using a split μ simulation procedure according to the disclosure.
Figure 18:
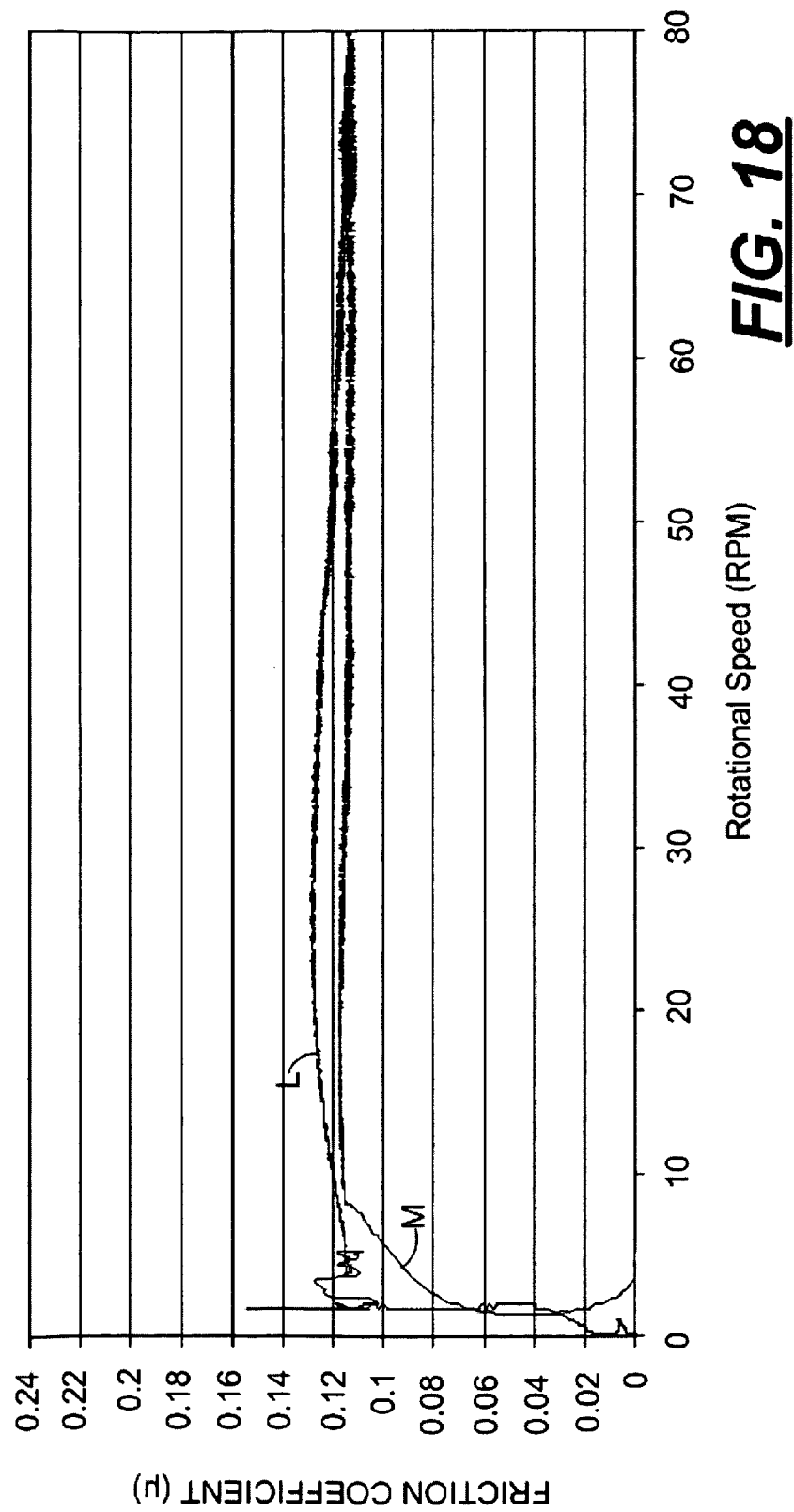
FIG. 18 is an rpm-domain graph of coefficient of friction versus rotational speed for a dry sump friction mapping cycle on a clutch pack that was aged using a split μ simulation procedure according to the disclosure.
Figure 19:
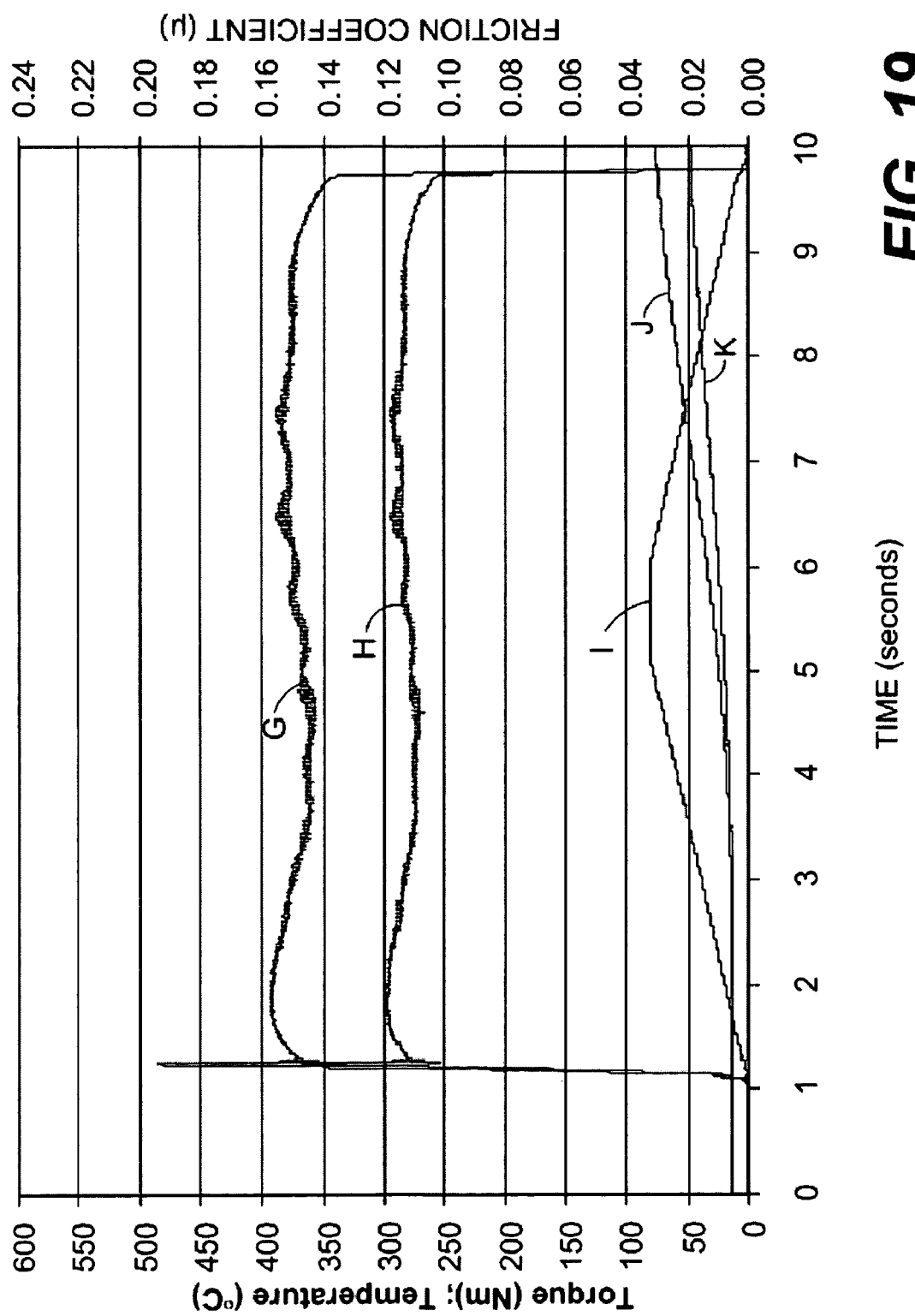
FIG. 19 is a time-domain graph of torque, temperature, and coefficient of friction versus time for a dry sump friction mapping cycle according to the disclosure on a clutch pack that was aged using a split μ vehicle test.

In this example, different axle fluids were used with the paper friction plates described in Example 1. The fluid used was a 75W140 viscosity grade gear lubricant with a limited slip top treat. Friction maps of 140 split μ simulation cycles were compared with those from a 220 split μ vehicle test. A summary graph of the friction mapping results for the simulation test is contained in FIG. 16. At about 63 cycles, the test was interrupted and restarted. Friction versus speed curves with clutch packs from the simulation tests (FIGS. 17-18) run at 10° C. and 900 kilopascals pressure compare well with the results obtained with the same fluid and friction plates after the 220 split μ vehicle test (FIGS. 19-20) run at the same temperature and pressure. Overall, the interfacial plate temperatures for this example were higher than for the examples using the fluids of example 1.

While there was a difference between the number of split μ cycles run in the simulation versus the vehicle test to produce similar friction curves, it is believed that the simulation cycles can be tuned, or calibrated, to deliver the same kind of frictional characteristics as the split μ vehicle tests with the fluids used in this example.

In summary, the split μ simulation procedure described herein appears to closely emulate a split μ vehicle test thereby providing a more cost effective method for evaluating the performance of fluids and materials for limited slip differentials. As shown by the foregoing examples, there is a rapid rise in interfacial plate temperature during the test cycles. Monitoring of the interfacial plate temperature using a convention split μ vehicle test is extremely difficult to accomplish. However, the apparatus and procedures described herein readily allows for monitoring of this important parameter.

Furthermore, the procedures described herein enable more simulation cycles to be run in a much shorter period of time thereby providing more rapid data generation for evaluation purposes. Accordingly, new technology for limited slip differentials may be evaluated more quickly than with full scale vehicle testing.

At numerous places throughout this specification, reference has been made to a number of U.S. patents. All such cited documents are expressly incorporated in full into this disclosure as if fully set forth herein.

The foregoing embodiments are susceptible to considerable variation in its practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A method of simulating a split μ axle test for limited slip differentials for automotive applications, the method comprising the steps of:
   treating a clutch pack for a limited slip differential in a lubricant composition for a first period of time at a predetermined temperature;
   mounting the clutch pack in a friction testing rig;
   providing a predetermined amount of test fluid to the testing rig; and
   cycling on and off a drive for the testing rig for a predetermined number of on and off cycles, wherein when the drive is on, a predetermined relative rotational speed between friction plates and metal plates in the clutch pack is generated.

2. The method of claim 1, wherein the clutch pack is treated for a first period of time ranging from about 0 to about 60 minutes.

3. The method of claim 1, wherein the clutch pack is compressed in the testing rig at a second pressure in a range of that observed on limited slip clutch packs in axles that are not rotating.

4. The method of claim 1, wherein the predetermined relative rotational speed ranges from about 100 to about 2000 rpm.

5. The method of claim 1, wherein the on cycles range from about 1 to about 20 seconds.

6. The method of claim 1, further comprising a step of mapping the friction characteristics of the clutch pack as a function of pressure and temperature by rotating the drive of the testing rig with the clutch pack disposed in a sump substantially devoid of fluid at pressures ranging from 100 to 800 kilopascals and at a temperature ranging from 5 to about 50° C.

7. The method of claim 1, further comprising compressing the clutch pack subsequent to the treating step for a second period of time at a first pressure.

8. The method of claim 7, wherein the second period of time is at least about five minutes.

9. The performance procedure of claim 8, wherein the second period of time ranges from about 1 to about three hours.

10. A method of mapping friction characteristics for limited slip differentials for automotive applications, the method comprising the steps of:
    mounting a clutch pack containing residual fluid thereon in a low speed friction testing rig, the testing rig being substantially devoid of test fluid;
    generating friction characteristics in the clutch pack as a function of temperature and pressure by rotating the clutch pack under conditions sufficient to provide relative rotational speed between friction plates and metal plates of the clutch pack; and
    recording torque characteristics of the clutch pack.

11. The method of claim 10, wherein the clutch pack is a clutch pack removed from an axle of a vehicle after a split μ vehicle test.

12. The method of claim 10, wherein the clutch pack is a clutch pack provided subsequent to a simulated split μ test.

13. The method of claim 10, wherein the clutch pack is mounted in the testing rig at a pressure ranging from about 100 to about 800 kilograms force.

14. The method of claim 10, wherein the clutch pack is mounted in the testing rig at a temperature ranging from about 50° to about 100° C.

15. A bench test procedure for evaluating materials for limited slip differentials for automotive applications, the bench test procedure comprising the steps of:
    treating a clutch pack for a limited slip differential in a lubricant composition for a first period of time at a predetermined temperature;
    mounting the clutch pack in a low speed friction testing rig containing a slow speed drive;
    providing a predetermined amount of test fluid to the testing rig;
    cycling on and off a drive for the testing rig for a predetermined number of on and off cycles, wherein when the drive is on, a predetermined relative rotational speed between friction plates and metal plates in the clutch pack is generated;
    subsequently draining the test fluid from the friction testing rig so that the testing rig is substantially devoid of fluid;
    generating friction characteristics in the clutch pack as a function of temperature and pressure by rotating the clutch pack under conditions sufficient to provide relative rotational speed between friction plates and metal plates of the clutch pack; and
    recording torque and coefficient of friction of the clutch pack.

16. The bench test procedure of claim 15, further comprising compressing the clutch pack subsequent to the treating step for a second period of time at a first pressure.

17. The bench test procedure of claim 16, wherein the second period of time ranges from about 1 to about three hours.

18. The bench test procedure of claim 15, wherein the first period of time ranges from about 0 to about 60 minutes.

19. The bench test procedure of claim 15, wherein the predetermined relative rotational speed ranges from about 100 to about 2000 rpm.

20. The bench test procedure of claim 15, wherein the on cycles range from about 15 to about 20 seconds.

21. The bench test procedure of claim 15, wherein the friction characteristics in the clutch pack are generated while the clutch pack is mounted in the testing rig at a temperature ranging from about 5° to about 100° C.

22. The bench test procedure of claim 15, wherein the clutch pack is compressed in the testing rig at a second pressure in a range of that observed on limited slip clutch packs in axles that are not rotating.

23. The bench test procedure of claim 22, wherein the second pressure ranges from about 100 to about 800 kilograms force.

* * * * *